US009812154B2

(12) United States Patent
Prasad et al.

(10) Patent No.: US 9,812,154 B2
(45) Date of Patent: Nov. 7, 2017

(54) METHOD AND SYSTEM FOR DETECTING SENTIMENT BY ANALYZING HUMAN SPEECH

(71) Applicant: Conduent Business Services, LLC, Dallas, TX (US)

(72) Inventors: Prathosh Aragulla Prasad, Mysore (IN); Vivek Tyagi, New Delhi (IN)

(73) Assignee: Conduent Business Services, LLC, Dallas, TX (US)

(*) Notice: Subject to any disclaimer, the term of this patent is extended or adjusted under 35 U.S.C. 154(b) by 0 days.

(21) Appl. No.: 15/000,068

(22) Filed: Jan. 19, 2016

(65) Prior Publication Data

US 2017/0206915 A1 Jul. 20, 2017

(51) Int. Cl.

| | |
|---|---|
| ***G10L 15/00*** | (2013.01) |
| ***G10L 25/63*** | (2013.01) |
| ***G10L 15/16*** | (2006.01) |
| ***G10L 15/02*** | (2006.01) |
| ***G10L 15/18*** | (2013.01) |
| ***G10L 25/30*** | (2013.01) |
| ***G10L 25/45*** | (2013.01) |

(52) U.S. Cl.

CPC .............. *G10L 25/63* (2013.01); *G10L 15/02* (2013.01); *G10L 15/16* (2013.01); *G10L 15/1807* (2013.01); *G10L 25/30* (2013.01); *G10L 25/45* (2013.01)

(58) Field of Classification Search

CPC . G10L 13/033; G10L 21/003; G10L 21/0205; G10L 21/0232; G10L 21/0364

USPC ......................................... 704/205, 223, 232

See application file for complete search history.

(56) References Cited

U.S. PATENT DOCUMENTS

| | | | | |
|---|---|---|---|---|
| 5,400,434 | A | 3/1995 | Pearson | |
| 6,275,806 | B1 | 8/2001 | Pertrushin | |
| 7,003,120 | B1 | 2/2006 | Smith et al. | |
| 7,627,475 | B2 | 12/2009 | Petrushin | |
| 8,965,770 | B2 | 2/2015 | Petrushin | |
| 9,031,834 | B2 * | 5/2015 | Coorman .............. | G10L 13/033 704/205 |
| 2009/0018826 | A1 * | 1/2009 | Berlin ..................... | G10L 15/07 704/223 |

(Continued)

OTHER PUBLICATIONS

Chih-Chung Chang and Chih-Jen Lin. Libsvm: a library for support vector machines. ACM Transactions on Intelligent Systems and Technology (TIST), 2(3):27, 2011.

(Continued)

*Primary Examiner* — Charlotte M Baker
(74) *Attorney, Agent, or Firm* — Jones Robb PLLC

(57) ABSTRACT

A method and a system for detecting sentiment of a human based on an analysis of human speech are disclosed. In an embodiment, one or more time instances of glottal closure are determined from a speech signal of the human. A voice source signal based on the determined one or more time instances of glottal closure is generated. A set of relative harmonic strengths is determined based on one or more harmonic contours of the voice source signal. The RHS is indicative of a deviation of the one or more harmonics of the voice source signal from a fundamental frequency of the voice source signal. A set of feature vectors is determined based on the RHS. The set of feature vectors are utilizable to detect the sentiment of the human.

20 Claims, 4 Drawing Sheets

(56) References Cited

U.S. PATENT DOCUMENTS

2012/0089396 A1 4/2012 Patel et al.

OTHER PUBLICATIONS

Carlos Busso, Sungbok Lee, and Shrikanth Narayanan. Analysis of emotioally salient aspects of fundamental frequency for emotion detection. Audio, Speech, and Language Processing, IEEE Transactions on, 17(4):582{596, 2009.

* cited by examiner

METHOD AND SYSTEM FOR DETECTING SENTIMENT BY ANALYZING HUMAN SPEECH

TECHNICAL FIELD

The presently disclosed embodiments are related, in general, to speech analysis. More particularly, the presently disclosed embodiments are related to method and system for detecting sentiment of a human based on an analysis of human speech.

BACKGROUND

Expansion of wired and wireless networks has enabled an entity, such as a customer, to communicate with other entities, such as a customer care representative, over such wired and wireless networks. For example, the customer care representative at a call center or a commercial organization, may communicate with the customers, or other individuals, to recommend new services/products or to provide technical support on existing services/products.

The communication between the entities may be a voiced conversation that may involve communication of a speech signal (generated by respective entities involved in the communication) between the entities. Usually, the entities involved in the communication or conversation may have a sentiment, which may affect the conversation. Further, identifying such sentiment during the conversation may allow the organization or the service provider to draw one or more inferences, based on the sentiment. For example, two organization may determine whether the entity is satisfied with the service being provided. In another scenario, the sentiment of the customer (in conversation with an employee, such as a customer care representative, of the service provider) may help to determine whether the conversation needs to the escalated to a superior of the customer care representative.

Further limitations and disadvantages of conventional and traditional approaches will become apparent to one of skilled in the art through a comparison of the described systems with some aspects of the present disclosure, as set forth in the remainder of the present application and with reference to the drawings.

SUMMARY

According to embodiments illustrated herein, there is provided a method for detecting sentiment of a human based on an analysis of human speech. The method includes determining, by one or more processors, one or more time instances of glottal closure from a speech signal of the human. The method further includes generating, by the one or more processors, a voice source signal based on the determined one or more time instances of glottal closure. The method further includes determining, by the one or more processor, a set of relative harmonic strengths based on one or more harmonic contours of the voice source signal. The relative harmonic strength (RHS) is indicative of a deviation of the one or more harmonics of the voice source signal from a fundamental frequency of the voice source signal. The method further includes determining, by the one or more processors, a set of feature vectors based on the set of relative harmonic strengths. The set of feature vectors are utilizable to detect the sentiment of the human.

According to embodiments illustrated herein, there is provided a system for detecting sentiment of a human based on an analysis of human speech. The system includes one or more processors are configured to determine one or more time instances of glottal closure from a speech signal of the human. The one or more processors are further configured to generate a voice source signal based on the determined one or more time instances of glottal closure. The one or more processors are further configured to determine a set of relative harmonic strengths based on one or more harmonic contours of the voice source signal. The relative harmonic strength (RHS) is indicative of a deviation of the one or more harmonics of the voice source signal from a fundamental frequency of the voice source signal. The one or more processors are further configured to determine a set of feature vectors based on the set of relative harmonic strengths. The set of feature vectors are utilizable to detect the sentiment of the human.

According to embodiments illustrated herein, there is provided a non-transitory computer-readable storage medium having stored thereon, a set of computer-executable instructions for causing a computer comprising one or more processors, configured to determine one or more time instances of glottal closure from a speech signal of a human. The one or more processors are further configured to generate a voice source signal based on the determined one or more time instances of glottal closure. The one or more processors are further configured to determine a set of relative harmonic strengths based on one or more harmonic contours of the voice source signal. The relative harmonic strength (RHS) is indicative of a deviation of the one or more harmonics of the voice source signal from a fundamental frequency of the voice source signal. The one or more processors are further configured to determine a set of feature vectors based on the set of relative harmonic strengths. The set of feature vectors are utilizable to detect sentiment of the human.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
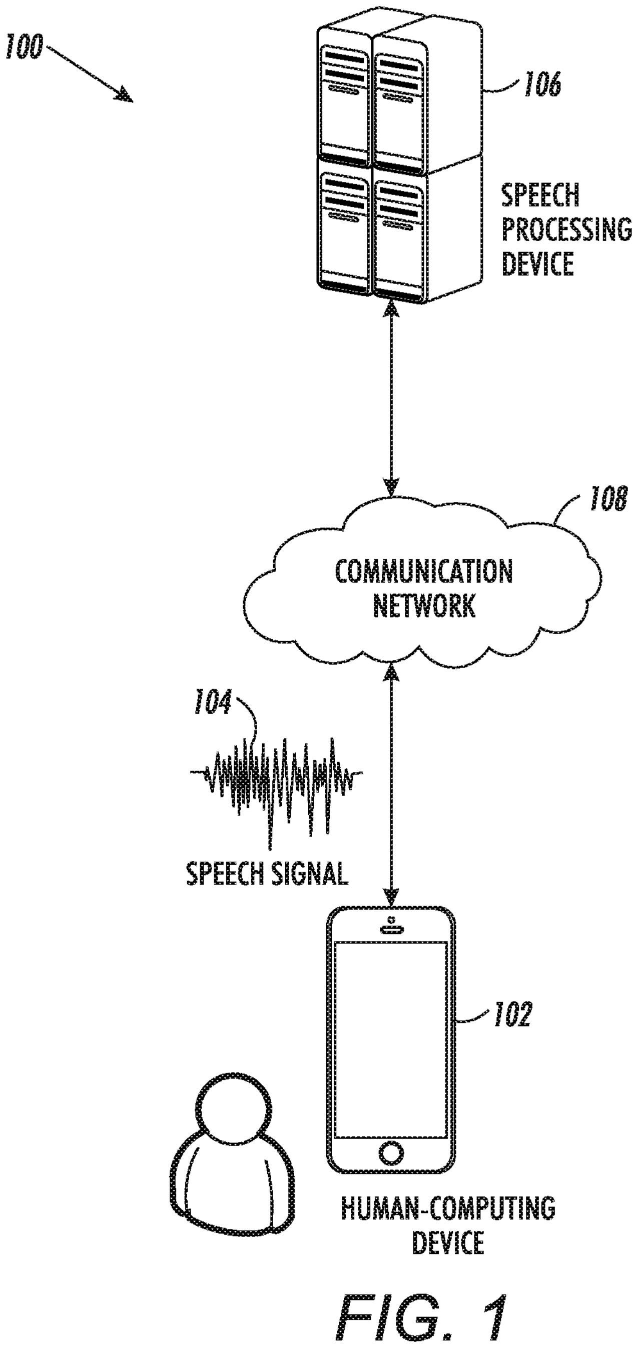
FIG. 1 is a block diagram that illustrates a system environment in which various embodiments of the system may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a smartphone, a tablet computer (e.g., iPad® and Samsung Galaxy Tab®), and/or the like.

A "conversation" refers to one or more dialogues exchanged between a first individual and a second individual. For example, the first individual may correspond to an agent (in a customer care environment), and the second individual may correspond to a customer. In accordance with an embodiment, the conversation may correspond to a voiced conversation between two or more individuals over a communication network. In an embodiment, the conversation may further correspond to a video conversation that may include transmission of a speech signal and a video signal.

A "human" refers to an individual who may be involved in a conversation with another individual. For example, the human may correspond to a customer, who is involved in a conversation with a service provide over a communication network.

A "speech" refers to an articulation of sound produced by a human. In an embodiment, the human may produce the sound during a conversation with other humans. In an embodiment, the speech may be indicative of thoughts, expressions, sentiments, and/or the likes of the human.

A "speech signal" refer to a signal that represents a sound produced by a human. In an embodiment, the speech signal may represent a pronunciation of a sequence of words. In an embodiment, the pronunciation of the sequence of words may vary based on the background and dialect of the human. Further, the speech signal is associated with frequencies in the audio frequency range. The speech signal may have one or more associated parameters such as, but are not limited to, an amplitude and a frequency of the speech signal. In an embodiment, the speech signal may be synthesized directly, or may through a transducer such as a microphone, headphone, or loudspeaker. The examples of the speech signal may include, but are not limited to, an audio conversation, a singing voice sample, or a creaky voice sample.

"Sampling" refers to a process of generating a plurality of discrete signals from a continuous signal. For example, a speech signal may be sampled to obtain one or more speech frames of a pre-defined time duration.

A "speech frame" refers to a sample of a speech signal that is generated based on at least a sampling of the speech signal. For example, a speech signal of "5000 ms" length may be sampled to obtain five speech frames of "1000 ms" time duration each.

A "voiced speech frame" refers to a speech frame, where an average power of the speech signal in the speech frame is greater than a threshold value. In an embodiment, the voiced speech may be produced when the vocal cords of the human vibrate during the pronunciation of a phoneme.

An "unvoiced speech frame" refers to a speech frame, where an average power of the speech signal in the speech frame is less than a threshold value. In an embodiment, the unvoiced speech may be produced when the vocal cords of the human do not vibrate periodically during the pronunciation of a phoneme.

"Time instances of glottal closure" refers to one or more time instants that are associated with a significant excitation of a vocal tract (to generate the speech signal). At the one or more time instants, the residual signal may exhibit high-energy value. In an embodiment, the high-energy value may correspond to an energy value that is greater than a predetermined threshold. Such time instances refer to as time instances of glottal closure. In an embodiment, the time instances of glottal closure may refers to the one or more time instances that are associated with the closure instances of glottis during the production of a voiced speech.

A "glottal wave" refers to a wave, which passes through the vocal tract to the lips, to generate the speech signal. Mathematically, if S[n] is a segment of a voiced speech frame and S(z) is its corresponding Z-transform, then $$S(z)=U(z)\cdot V(z)\cdot R(z)$$

where,

U(z): corresponds to a glottal wave;

V(z): corresponds to a transfer function of a vocal tract filter; and

R(z): corresponds to a lip radiation, which is usually modelled as a first order differencing operator ($R(z)=1-Z^{-1}$).

Usually, U(z) is combined with R(z) to modify the above equation as $S(z)=U'(z)\cdot V(z)$.

A "voice source signal" refers to a signal that is derived from a speech signal. In an embodiment, the voice source signal may be obtained by performing inverse filtering of the speech signal. In an embodiment the voice source signal is generated using one or more time instances of glottal closure in the speech signal. The generated voice source signal is pitch synchronous.

A "harmonic spectrum" refers to a spectrum that includes one or more frequency components of a signal. The frequency of each of the one or more frequency components is a whole number multiple of a fundamental frequency.

A "relative harmonic strength" refers to a relative spectral energy of a voice source signal at one or more harmonics with respect to a spectral energy at a fundamental frequency or a pitch frequency. In an embodiment, the relative harmonic strength (RHS) may be defined as a deviation of the one or more harmonics of the voice source signal from the fundamental frequency of the voice source signal.

"Harmonic contours" refers to a pattern of change in one or more harmonics of the voice source signal, over intervals between one or more time instances of glottal closure. In an embodiment, the harmonic contour may be determined based on the one or more harmonics of the voice source signal.

A "set of feature vectors" refers to one or more features associated with one or more harmonic contours of a voice source signal. In an embodiment the set of features may be determined based on a statistical analysis of the one or more harmonic contours.

A "sentiment" refers to an opinion, a mood, or a view of a human towards a product, a service, or another entity. In an embodiment, the sentiment may be representative of a feeling, an attitude, a belief, and/or the like. In an embodiment, the sentiment may be positive sentiment, such as happiness, satisfaction, contentment, amusement, and/or other positive feelings of the human. Further, the sentiment may be a negative sentiment, such as anger, disappointment, resentment, irritation, and/or other negative feelings.

A "set of pitch features" refers to one or more characteristics of a pitch in a speech signal of a human. In an embodiment, the set of pitch features are determined from a pitch contour extracted for each voiced speech frame. In an embodiment, the set of pitch features may be determined based on a statistical analysis of the pitch contour. In an embodiment, the set of pitch features may include a minima of the pitch contour, a maxima of the pitch contour, a mean of the pitch contour, a dynamic range of the pitch contour, a percentage of number of times the pitch contour has positive slope, and values of the coefficient of second order polynomial and the first order polynomial that best fits the pitch contour.

A "set of intensity features" refers to one or more characteristics of an intensity in a speech signal of a human. For example, an intensity may correspond to a loudness in the speech. Firstly, one or more intensity contours are obtained from a speech signal. Thereafter, the set of intensity features may be determined based on a statistical analysis of the one or more intensity contours. Examples of the set of intensity features may include, but are not limited to, a minimum, a maximum, a mean, and a dynamic range of the one or more intensity contours.

A "set of duration features" refers to one or more characteristics associated with a relative duration between a plurality of classes of a speech frame of a speech signal. The plurality of classes of the speech frame may correspond to one or more voiced speech frames and one or more unvoiced speech frames of the speech signal. For example, the set of duration features may include a ratio of the duration of an unvoiced speech frame to that of a voiced speech frame in a given speech frame. The set of duration features may further include a ratio of the duration of the unvoiced speech frame to a total duration of the speech frame. The set of duration features may further include a ratio of the duration of the voiced speech frame to the total duration of the speech frame.

A "classifier" refers to a mathematical model that may be configured to predict sentiment of a human based on a set of feature vectors, a set of pitch features, a set of intensity features, and a set of duration features. In an embodiment, the classifier may be trained based on at least the historical data to predict the sentiment of a human being. Examples of the classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier.

FIG. 1 is a block diagram that illustrates a system environment 100 in which various embodiments of a method and a system for detecting a sentiment of a human, based on an analysis of human speech, may be implemented. The system environment 100 includes a human-computing device 102, a speech processing device 106, and a communication network 108. Various devices in the system environment 100 may be interconnected over the communication network 108. FIG. 1 shows, for simplicity, one human-computing device 102, and one speech processing device 106. However, it will be apparent to a person having ordinary skill in the art that the disclosed embodiments may also be implemented using multiple human-computing devices, and multiple speech processing devices without departing from the scope of the disclosure.

The human-computing device 102 refers to a computing device that may be utilized by a human to communicate with one or more other humans. The human may correspond to an individual (e.g., a customer) who may be involved in a conversation (e.g., a telephonic or a video conversation) with the one or more other humans (e.g., a service provider agent). The human-computing device 102 may comprise one or more processors in communication with one or more memories. The one or more memories may include one or more computer readable codes, instructions, programs, or algorithms that are executable by the one or more processors to perform one or more predetermined operations. The human-computing device 102 may further include one or more transducers, such as, a microphone, a headphone, or a speaker to produce a speech signal 104. For example, a customer may utilize a computing device, such as the human-computing device 102, to connect with the computing devices of other humans, such as a service provider agent over the communication network 108. After connecting with the service provider agent over the communication network 108, the human may be involved in a conversation (e.g., audio or video conversation) with the service provider agent. The one or more transducers in the human-computing device 102 may convert the speech of the human into a signal such as the speech signal 104, which is transmitted to the computing device (not shown) of the service provider agent over the communication network 108. The computing device of the service provider agent convert back the speech signal 104 into an audible speech. In another embodiment, the speech signal 104 may be transmitted to the speech processing device 106 over the communication network 108.

Examples of the human-computing device 102 may include, but are not limited to, a personal computer, a laptop, a personal digital assistant (PDA), a mobile device, a smartphone, a tablet, or any other computing device.

The speech processing device 106 may refer to a computing device with a software/hardware framework that may provide a generalized approach to create a speech processing implementation. The speech processing device 106 may include one or more processors in communications with one or more memories. The one or more memories may include one or more computer readable codes, instructions, programs, or algorithms that are executable by the one or more processors to perform one or more predetermined operations. The one or more predetermined operations may include, but are not limited to, receiving the speech signal 104 from the human-computing device 102, sampling the received speech signal 104 to obtain one or more speech frames, and extracting one or more voiced speech frames and one or more unvoiced speech frames from each of the one or more speech frames. The one or more predetermined operations may further include determining one or more time instances of glottal closure in each of the one or more voiced speech frames, generating a voice source signal for each of the one or more voiced speech frames based on at least the determined one or more time instances of glottal closure, and determining a set of relative harmonic strengths based on at least one or more harmonics of the voice source signal. The one or more predetermined operations may further include determining a set of feature vectors based on at least the determined set of relative harmonic strengths and detecting the sentiment of the human based on at least the determined set of feature vectors. The examples of the speech processing device 106 may include, but are not limited to, a personal computer, a laptop, a mobile device, or any other computing device.

A person having ordinary skill in the art will understand that the scope of the disclosure is not limited to the speech processing device 106 as a separate entity. In an embodiment, the speech processing device 106 may be implemented on or by an application server (not shown). In such a case, the application server may be configured to perform the one or more predetermined operations. The application server may be realized through various types of application servers such as, but not limited to, Java application server, .NET framework application server, and Base4 application server.

Further, a person having ordinary skill in the art will understand that the speech processing device 106 may be implemented within the computing device associated with service provider agent, without limiting the scope of the disclosure.

The communication network 108 may include a medium through which devices, such as the human-computing device 102 and the speech processing device 106 may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

Figure 2:
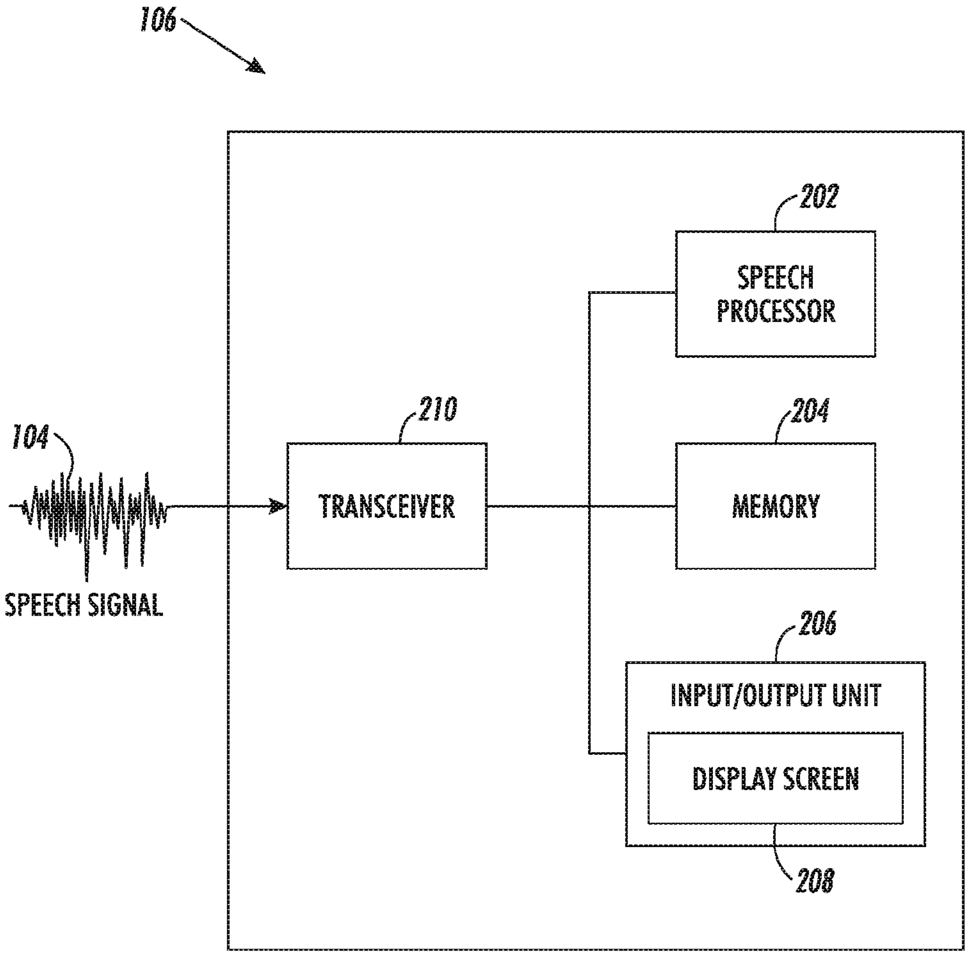
FIG. 2 is a block diagram that illustrates various components of a speech processing device, in accordance with at least one embodiment.

FIG. 2 is a block diagram that illustrates various components of the speech processing device 106, in accordance with at least one embodiment. FIG. 2 is explained in conjunction with the FIG. 1.

The speech processing device 106 includes one or more speech processors, such as a speech processor 202, one or more memories, such as a memory 204, one or more input/output units, such as an input/output (I/O) unit 206, one or more display screens, such as a display screen 208, and one or more transceivers, such as a transceiver 210. A person with ordinary skill in the art will appreciate that the scope of the disclosure is not limited to the components as described herein.

The speech processor 202 may comprise suitable logic, circuitry, interface, and/or code that may be configured to execute one or more sets of instructions stored in the memory 204. The speech processor 202 may be coupled to the memory 204, the I/O unit 206, and the transceiver 210. The speech processor 202 may execute the one or more sets of instructions, programs, codes, and/or scripts stored in the memory 204 to perform the one or more predetermined operations. For example, the speech processor 202 may work in coordination with the memory 204, the I/O unit 206 and the transceiver 210, to process the speech signal 104 to detect the sentiment of the human. The speech processor 202 may be implemented based on a number of processor technologies known in the art. Examples of the speech processor 202 include, but are not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The memory 204 may comprise suitable logic, circuitry, and/or interfaces that may be operable to store one or more machine codes, and/or computer programs having at least one code section executable by the speech processor 202. The memory 204 may be further configured to store the one or more sets of instructions, codes, and/or scripts. In an embodiment, the memory 204 may be configured to store the one or more speech signals, such as the speech signal 104. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the speech processor 202 to perform the one or more predetermined operations. It will be apparent to a person having ordinary skill in the art that the one or more sets of instructions, programs, codes, and/or scripts stored in the memory 204 may enable the hardware of the system environment 100 to perform the one or more predetermined operations.

The I/O unit 206 may comprise suitable logic, circuitry, interfaces, and/or code that may be configured to transmit or receive the speech signal 104 and other information to/from the one or more devices, such as the human-computing device 102 over the communication network 108. The I/O unit 206 may also provide an output to the human. The I/O unit 206 may comprise various input and output devices that may be configured to communicate with the transceiver 210. The I/O unit 206 may be connected with the communication network 108 through the transceiver 210. The I/O unit 206 may further include an input terminal and an output terminal. In an embodiment, the input terminal and the output terminal may be realized through, but are not limited to, an antenna, an Ethernet port, an USB port or any other port that can be configured to receive and transmit data. Examples of the I/O unit 206 may include, but are not limited to, a keyboard, a mouse, a joystick, a touch screen, a touch pad, a microphone, a camera, a motion sensor, and/or a light sensor. Further, the I/O unit 206 may include a display screen 208. The display screen 208 may be realized using suitable logic, circuitry, code and/or interfaces that may be operable to display at least an output, received from the speech processing device 106, to an individual such as a service provider agent. In an embodiment, the display screen 208 may be configured to display the detected sentiment of the human through a user interface to the service provider agent. The display screen 208 may be realized through several known technologies, such as, but are not limited to, Liquid Crystal Display (LCD) display, Light Emitting Diode (LED) display, and/or Organic LED (OLED) display technology.

The transceiver 210 may comprise suitable logic, circuitry, interface, and/or code that may be operable to communicate with the one or more devices, such as the human-computing device 102 over the communication network 108. The transceiver 210 may be operable to transmit or receive the one or more sets of instructions, queries, speech signals, or other information to/from various components of the system environment 100. The transceiver 210 may implement one or more known technologies to support wired or wireless communication with the communication network 108. In an embodiment, the transceiver 210 may be coupled to the I/O unit 206 through which the transceiver 210 may receive or transmit the one or more sets of instructions, queries, speech signals and/or other information corresponding to the detection of the sentiment of the human. In an embodiment, the transceiver 210 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
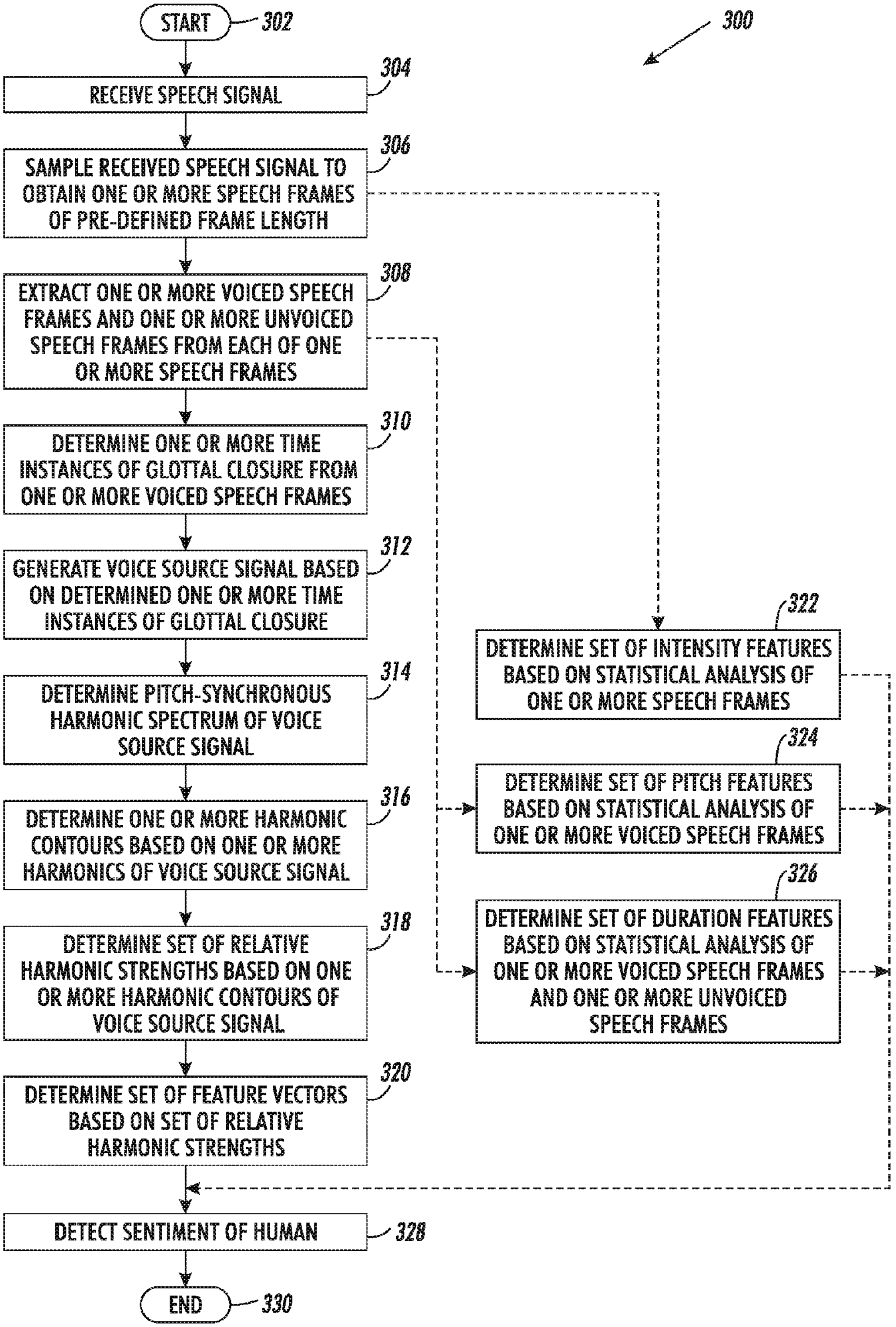
FIG. 3 illustrates a flowchart of a method for detecting sentiment based on an analysis of human speech, in accordance with at least one embodiment.

FIG. 3 illustrates a flowchart of a method for detecting sentiment based on an analysis of a human speech, in accordance with at least one embodiment. The flowchart is described in conjunction with FIG. 1 and FIG. 2. The method starts at step 302 and proceeds to step 304.

At step 304, the speech signal 104 is received. In an embodiment, the transceiver 210 may be configured to receive the speech signal 104 from the human-computing device 102. The transceiver 210 may receive the speech signal 104 from the human-computing device 102, via the communication network 108. Prior to the receiving of the speech signal 104, the human may utilize the human-computing device 102 to connect with computing devices of other humans (e.g., a customer care agent) over the communication network 108. Further, the human may communicate with the other humans. Such communication may correspond to a voice communication. For the purpose of voice communication, the human-computing device 102 may comprise the one or more transducers and one or more other components (e.g., ADC converters, DAC converters, Filters, and/or the like) that convert the speech of the human into a signal form, such as the speech signal 104. Further, the human-computing device 102 may transmit the speech signal 104 to the speech processing device 106 over the communication network 108.

A person having ordinary skill in the art will appreciate that the scope of the disclosure is not limited to the speech processing device 106 as an independent device. In another embodiment, the speech processing device 106 may be a part of a computing device associated with the customer care agent.

After receiving the speech signal 104 from the human-computing device 102, the transceiver 210 may transmit the speech signal 104 to the speech processor 202. In another embodiment, the transceiver 210 may store the speech signal 104 into the memory 204. In such a case, the speech processor 202 may extract the speech signal 104 from the memory 204. After receiving the speech signal 104, the speech processor 202 may be configured to analyze or process the received speech signal 104. The various analysis of the received speech signal 104 have been discussed in details in subsequent steps.

At step 306, the received speech signal 104 is sampled. In an embodiment, the speech processor 202 may be configured to sample the received speech signal 104 (hereinafter, the speech signal 104). In an embodiment, the speech processor 202 may sample the speech signal 104 to obtain the one or more speech frames of one or more pre-defined time duration. The speech processor 202 may utilize one or more sampling algorithms and one or more filtering components known in the art to obtain the one or more speech frames of the speech signal 104. For example, a duration of a speech signal, such as the speech signal 104, is "10 seconds". Based on a predefined instruction stored in the memory 204, it may be desired to generate one or more speech frames of "1000 ms" each. In such a case, the speech processor 202 may sample the speech signal 104 to generate the one or more speech frames, each speech frame with "1000 ms" time duration. In such a case, a count of the one or more speech frames may be equal to "10 seconds/1000 m5=10".

A person with ordinary skill in the art will understand that for brevity, the method for detecting the sentiment of the human is hereinafter explained with respect to one speech frame. Notwithstanding, the disclosure may not be so limited, and the method may be further implemented for other speech frames from the one or more speech frames, without deviation from the scope of the disclosure.

At step 308, the one or more voiced speech frames and the one or more unvoiced speech frames are extracted from the speech frame. In an embodiment, the speech processor 202 may be configured to extract the one or more voiced speech frames and the one or more unvoiced speech frames from the speech frame. In an embodiment, the speech processor 202 may be configured to extract the one or more voiced speech frames from the speech frame based on an analysis of the speech frame in time domain. In alternate embodiment, the speech processor 202 may extract the one or more voiced speech frames based on the analysis of the speech signal in frequency domain. In an embodiment, the one or more voiced speech frames may exhibit a relatively high energy compared to an unvoiced speech frame. Further, the one or more voiced speech frames may have a few number of zero crossings in comparison to a count of zero crossing in the one or more unvoiced speech frames. In an embodiment, the speech processor 202 may extract the one or more voiced speech frames from the speech frame based on the energy and the count of zero crossings of the speech signal in the speech frame. Similarly, the speech processor 202 may extract the one or more unvoiced speech frames from the speech signal in the speech frame. In an embodiment, the speech processor 202 may utilize one or more algorithms (e.g., a Robust Algorithm for Pitch Tracking (RAPT) algorithm) known in the art to extract the one or more voiced speech frames and the one or more unvoiced speech frames from the speech frame.

A person having ordinary skill in the art will appreciate that the scope of the disclosure is not limited to extracting the one or more voiced speech frames and the one or more unvoiced speech frames using RAPT algorithm. In an embodiment, any other algorithm may be used to extract the one or more voiced speech frames and the one or more unvoiced speech frames.

At step 310, the one or more time instances of glottal closure are determined in a voiced frame of the one or more voiced frames. In an embodiment, the speech processor 202 may be configured to determine the one or more time instances of glottal closure. The one or more time instances of glottal closure may correspond to one or more time instants where the energy value in the voiced speech frame of the speech signal 104. In an embodiment, the high-energy value may correspond an energy value that is greater than a predetermined threshold. Each of the one or more time instants is associated with a significant excitation of a vocal tract of the human.

In an embodiment, the speech processor 202 may be configured to determine the one or more time instances of glottal closure in each of the one or more voiced speech frames. In an embodiment, the speech processor 202 may utilize a dynamic plosion index (DPI) algorithm to determine the one or more time instances of glottal closure. A person with ordinary skill in the art will appreciate that the scope of the disclosure is not limited to the determination of the one or more time instances using the aforementioned DPI algorithm. The speech processor 202 may utilize one or more algorithms such as, but are not limited to, a Hilbert Envelope (HE) algorithm, a Zero Frequency Resonator (ZFR) algorithm, a Dynamic Programming Phase Slope Algorithm (DYPSA), a Speech Event Detection using the Residual Excitation And a Mean based Signal (SEDREAMS), or a Yet Another GCI Algorithm (YAGA), to determine the one or more time instances of glottal closure.

Based on the one or more time instances of the glottal closure, the speech processor 202 may further determine one or more pitch periods. A pitch period may correspond to a time interval between two successive time instances of glottal closure.

In an embodiment, the speech processor 202 may further define a window at each time instance of the glottal closure. In an embodiment, the duration of the window is predefined and may vary based on the application area. In an embodiment, the predefined duration of the window may be three successive time instances of glottal closure. For example, at $i^{th}$ time instance of glottal closure, the speech processor 202 defines a window such that the window encompasses the $i^{th}$ time instance and all successive time instances of glottal closure till $(i+3)^{th}$ time instance of the glottal closure. Therefore, such a window may encompass three pitch periods (e.g., $i^{th}$ to $i+1^{th}$ pitch period, $i+1^{th}$ to $i+2^{th}$ pitch period, and $i+2^{th}$ to $i+3^{th}$ pitch period).

At step 312, the voice source signal is generated. In an embodiment, the speech processor 202 may be configured to generate the voice source signal based on the defined window at each time instance of glottal closure. As the voiced speech frame comprises one or more time instances of glottal closure and the window is defined at each time instance, therefore one or more windows may be defined in the voiced speech frame. In an embodiment, the speech processor 202 may be configured to generate the voice source signal corresponding to each of the one or more windows using a linear prediction (LP) based inverse filtering technique. In an embodiment, the speech processor 202 may utilize the LP based inverse filtering technique with a prediction order that is equal to twice the sampling frequency (in KHz) of the voiced speech frame. The prediction order may be determined in accordance with the following equation:

$$P=2F+2$$

where

P: Prediction order; and

F: Sampling frequency (in KHz) of the speech signal.

In an embodiment, the speech processor 202 may extract the voice source signal pitch synchronously. Thus, the generated voice source signal is a pitch-synchronous signal.

A person with ordinary skill in the art will appreciate that the scope of the disclosure is not limited to the LP-based inverse filtering technique for generation of the voice source signal as described herein. The speech processor 202 may utilize other algorithms known in the art to generate the voice source signal.

At step 314, a pitch-synchronous harmonic spectrum of the voice source signal is determined. In an embodiment, the speech processor 202 may be configured to determine the pitch-synchronous harmonic spectrum of the voice source signal. In an embodiment, the speech processor 202 may utilize a discrete Fourier transform (DFT) based algorithm and/or other algorithms known in the art to determine the pitch-synchronous harmonic spectrum. In an embodiment, the pitch-synchronous harmonic spectrum of the voice source signal is obtained by determining the magnitude of the DFT of the voice source signal.

A person having ordinary skill in the art will appreciate that the pitch-synchronous harmonic spectrum of the voice source signal may include one or more harmonics. The one or more harmonics may be determined based on a fundamental frequency of the voice source signal. In an embodiment, the one or more harmonics may correspond to an integral multiple of the fundamental frequency. For example, the speech processor 202 may determine the one or more harmonics, $h_i$ from the voice source signal with fundamental frequency as F, such that $h_i$=nF, where n is an integer.

At step 316, one or more harmonic contours are determined. In an embodiment, the speech processor 202 may be configured to determine the one or more harmonic contours based on the determined one or more harmonics of the voice source signal. In an embodiment, the one or more harmonic contours may be determined by collating spectral amplitudes of the one or more harmonics over a pitch-synchronous harmonic spectrum.

At step 318, the set of relative harmonic strengths is determined. In an embodiment, the speech processor 202 may be configured to determine the set of relative harmonic strengths of the voice source signal. A relative harmonic strength (RHS) may correspond to a deviation of the one or more harmonics of the voice source signal from the fundamental frequency of the voice source signal. In an embodiment, the relative harmonic strength is representative of a relative spectral energy of the voice source signal at the one or more harmonics with respect to the fundamental frequency. The relative spectral energy is defined as a ratio of a cumulative $l_2$ norms of the pitch-synchronous harmonic spectrum at each of the one or more harmonics to that up to the fundamental frequency.

In an embodiment, the set of relative harmonic strengths may be determined based on a signal analysis and/or a statistical analysis of the one or more harmonic contours of the voice source signal. For example, for a voice frame of a speech frame, five harmonic contours are generated. In an embodiment, a length of each harmonic contour is equal to number of time instances of glottal closure in the voiced speech frame. In such a case, the set of five relative harmonic strengths may be determined based on a mean of each of the five harmonic contours.

At step 320, a set of feature vectors is determined. In an embodiment, the speech processor 202 may be configured to determine the set of feature vectors based on the set of relative harmonic strengths. In an embodiment, a value of each of the set of feature vectors is determined based on the set of relative harmonic strengths. The set of feature vectors may be determined by performing an operation, such as a Euclidean inner-products of the one or more harmonic contours of each RHS with each other.

The determined set of feature vectors may be utilized independently to determine the sentiment of the human. In one embodiment, the determined set of features is utilized in conjunction with a set of intensity features, a set of pitch features, and a set of duration features, extracted from the speech signal 104, to determine the sentiment of the human. The determination of the set of intensity features, the set of pitch features, and the set of duration features have been explained in step 322, step 324, and step 326, respectively.

At step 322, a set of intensity features is determined. In an embodiment, the speech processor 202 may be configured to determine the set of intensity features. In an embodiment, the speech processor 202 may be configured to determine a measure of intensities of the speech signal over a predefined duration (e.g., "40 ms") of the speech frame. The measure of intensity associated with a speech signal may correspond to a measure of loudness of the human. In an embodiment, the speech processor 202 may determine the measure of intensities based on frequency domain analysis of the speech signal corresponding to the speech frame. In an embodiment, the speech processor 202 may determine area under a curve, representing the speech signal in the frequency domain, to determine the measure of the intensities. Thereafter, the speech processor 202 may determine the intensity contour for the speech frame based on the measure of the intensities. In an embodiment, the speech processor 202 may determine the set of intensity features from the intensity contour. The set of intensity features may include, but are not limited to, a minimum, a maximum, a mean, and a dynamic range of the one or more intensity contours. The set of intensity features may further include a percentage of times the one or more intensity contours have positive slopes. The set of intensity features may further include a ratio of a $l_2$ norm of the speech frame above "3 KHz" and below "600 Hz" to a total energy of the speech frame. The set of intensity features may further include a ratio of a $l_2$ norm of the speech frame over one or more unvoiced regions to that of one or more voiced regions. After determining the set of intensity features, the speech processor 202 may store the determined set of intensity features in the memory 204.

At step 324, a set of pitch features is determined. In an embodiment, the speech processor 202 may be configure to determine the set of pitch features. In an embodiment, the speech processor 202 may be configured to determine the pitch contours for each of the one or more voiced speech frames in the speech frame using one or more algorithms/software (e.g., RAPT algorithm, Praat speech processing software, and/or the like) known in the art. Thereafter, the speech processor 202 may determine the set of pitch features based on the pitch contour. In an embodiment, the set of pitch features may include, but are not limited to, a minimum, a maximum, a mean, and a dynamic range of the contours. The set of pitch features may further include a percentage of times the pitch contours have positive slopes. The set of pitch features may further include a coefficient of the best first and second order polynomial fits for the one or more pitch contours. After determining the set of pitch features, the speech processor 202 may store the determined set of pitch features in the memory 204.

At step 326, a set of duration features is determined. In an embodiment, the speech processor 202 may be configured to determine the set of duration features. For example, the set of duration features may include a ratio of the duration of the one or more unvoiced speech frames to that of the one or more voiced speech frames in a given speech frame. The set of duration features may further include a ratio of the duration of the one or more unvoiced speech frames to a total duration of the speech frame. The set of duration features may further include a ratio of the duration of the one or more voiced speech frames to the total duration of the speech frame. After determining the set of duration features, the speech processor 202 may store the determined set of duration features in the memory 204.

At step 328, the sentiment of the human is detected. In an embodiment, the speech processor 202 may be configured to detect the sentiment of the human. The speech processor 202, as discussed in step 328, utilizes the one or more trained classifiers to categorize the human speech into one of the categories. In an embodiment, the one or more trained classifiers may receive the determined set of feature vectors, the set of intensity features, the set of pitch features, and the set of duration features from the speech processor 202. Thereafter, the speech processor 202 may categorize the speech signal 104 into one of the categories. The categories may correspond to a positive sentiment category or a negative sentiment category. In another embodiment, the categories may correspond to one or more of, but are not limited to, happiness, satisfaction, contentment, amusement, anger, disappointment, resentment, and irritation. Based on such a categorization, the speech processor 202 may predict the sentiment of the human. For example, a human is in a conversation with a customer care agent. The speech processor 202 categorizes the speech of the human into a positive sentiment category. In such a case, based on the categorization, the customer care agent may estimate that the human is happy with existing services. Control passes to end step 330.

A person having ordinary skill in the art will understand that the method for detecting sentiments of the human is not limited to the sequence of steps as described in FIG. 3. The steps may be processed in any sequence to detect the sentiments of the human.

Figure 4:
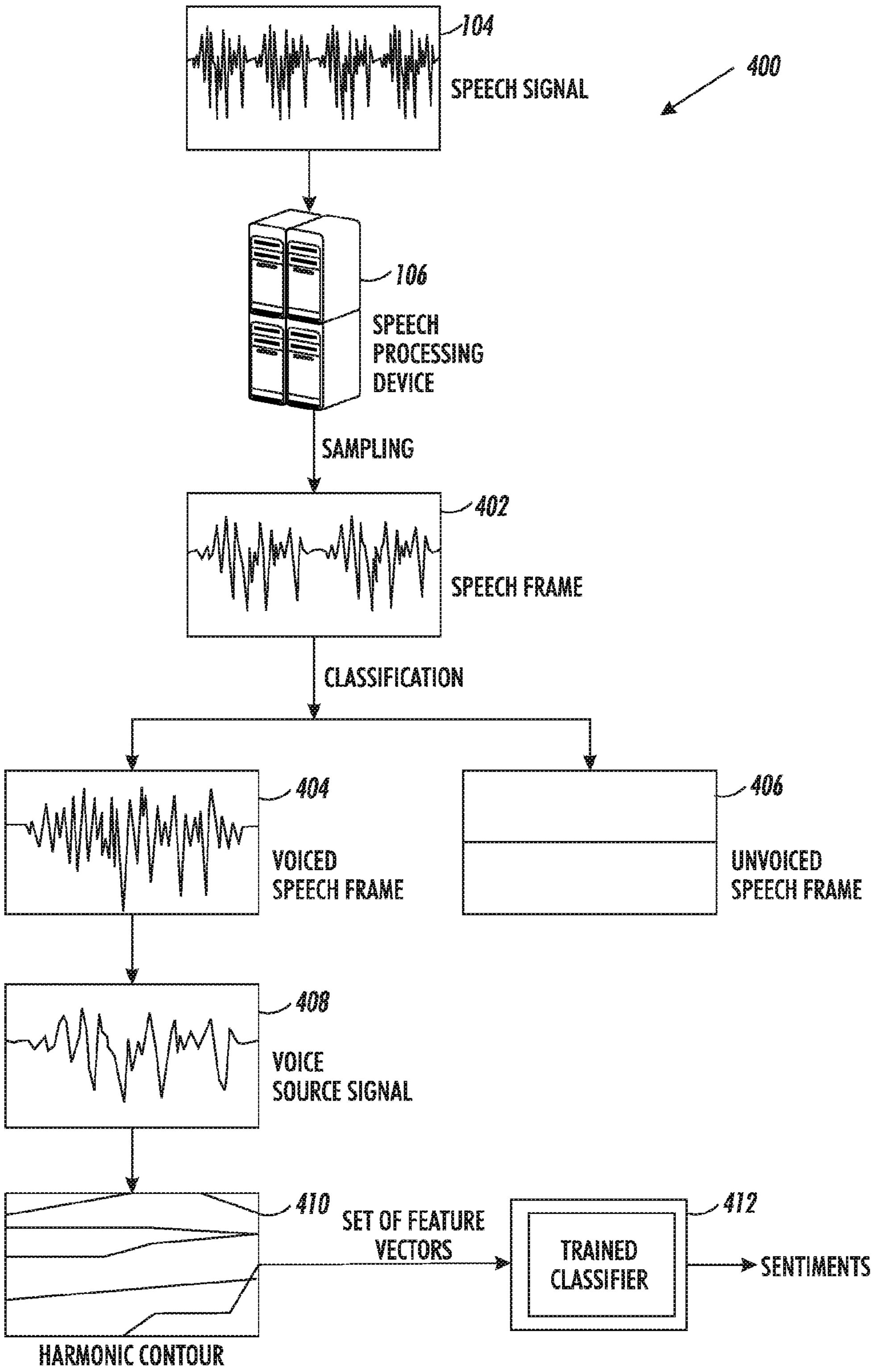
FIG. 4 is a flow diagram that illustrates an exemplary scenario for detecting sentiment of a human based on an analysis of human speech, in accordance with at least one embodiment.

FIG. 4 is a flow diagram that illustrates an exemplary scenario for detecting sentiment of a human based on an analysis of human speech, in accordance with at least one embodiment. The flow diagram is described in conjunction with FIG. 1, FIG. 2, and FIG. 3.

With reference to FIG. 4, there is shown a speech signal 104 and the speech processing device 106. The speech signal 104 may have been generated by a computing device (e.g., the human-computing device 102) of a human when the human is in a conversation with a customer care agent in a customer care environment. The human-computing device 102 (e.g., a mobile device, a laptop, or a tablet) converts the speech (or sound) produced by the human into the speech signal 104. Further, the human-computing device 102 may transmit the generated speech signal 104 to the speech processing device 106 over the communication network 108. In another embodiment, the customer care agent may direct the speech signal 104 to the speech processing device 106.

After receiving the speech signal 104, the speech processing device 106 may process the speech signal 104 for detection of the sentiment of the human. In an embodiment, the speech processing device 106 may sample the speech signal 104 into one or more speech frames, such as a speech frame 402, of a pre-defined time duration (e.g., 1500 ms). Further, the speech processing device 106 may extract one or more voiced speech frames, such as a voiced speech frame 404, and one or more unvoiced speech frames, such as an unvoiced speech frame 406, from the speech frame 402. The voiced speech frame 404, and the unvoiced speech frame 406 may be extracted from the speech frame 402 using a Robust Algorithm for Pitch Tracking (RAPT) algorithm. Further, the speech processing device 106 may determine one or more time instances of glottal closure from the voiced speech frame 404, using a dynamic plosion index (DPI) algorithm. Based on the determined one or more time instances of glottal closure, the speech processing device 106 may generate a voice source signal 408. In an embodiment, the speech processing device 106 may determine a pitch-synchronous harmonic spectrum of the voice source signal 408, using a Discrete Fourier Transform (DFT) algorithm. Further, the speech processing device 106 may determine one or more harmonics from the pitch-synchronous harmonic spectrum of the voice source signal 408. Based on the determined one or more harmonics, the speech processing device 106 may determine one or more harmonic contours (denoted by 410) of the voice source signal 408.

The speech processing device 106 may further determine a set of relative harmonic strengths based on a signal analysis and/or a statistical analysis of the one or more harmonic contours (denoted by 410) of the voice source signal 408. After determining the set of relative harmonic strengths, the speech processing device 106 may determine a set of feature vectors based on the set of relative harmonic strengths. Further, a trained classifier (denoted by 412) is utilized to detect the sentiment of the human based on at least the determined set of feature vectors. Based on at least the determined set of feature vectors, the trained classifier categorizes the speech of the human into one of the categories, such as "happiness", "sadness", "angry", or "irritation".

The disclosed embodiments encompass numerous advantages. The disclosure provides a method and a system for analyzing speech of a human. The human may be in a conversation with another human, such as a customer care representative. The disclosed method utilizes a spectral characteristics of a voice source signal, determined from a speech signal 104 of the human, for detecting the sentiment or emotion of the human. The spectral characteristics of the voice source signal may include time instances of glottal closure, relative harmonic strengths, harmonic contours, and/or the like. The sentiments of the human is further determined based on the combination of the intensity features, duration features, pitch features. As multiple features are being used to determine the sentiment of the human, the detected sentiment is much more accurate in comparison to the conventional techniques. Further, the detected sentiments allow the service provider to recommend one or more new products/services, or an improved/affordable solution to existing products/services.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described may also be implemented using only software programming or using only hardware or by a varying combination of the two techniques. The disclosure is independent of the programming language and the operating system used in the computers. The instructions for the disclosure may be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in various operating systems and platforms including, but not limited to, 'Unix', DOS', 'Android', 'Symbian', and 'Linux'.

The programmable instructions may be stored and transmitted on a computer-readable medium. The disclosure may also be embodied in a computer program product comprising a computer-readable medium, or with any product capable of implementing the above methods and systems, or the numerous possible variations thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Various embodiments of the methods and systems for detecting sentiments of a human based on an analysis of human speech have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims may encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for detecting sentiment of a human based on an analysis of human speech, the method comprising;

determining, by one or more processors, one or more time instances of glottal closure from a speech signal of the human;

generating, by the one or more processors, a voice source signal based on the determined one or more time instances of glottal closure;

determining, by the one or more processor, a set of relative harmonic strengths based on one or more harmonic contours of the voice source signal, wherein a relative harmonic strength (RHS) is indicative of a deviation of one or more harmonics of the voice source signal from a fundamental frequency of the voice source signal; and determining, by the one or more processors, a set of feature vectors based on the set of relative harmonic strengths, wherein the set of feature vectors is utilizable to detect the sentiment of the human.

2. The method of claim 1 further comprising sampling, by the one or more processors, the received speech signal to obtain one or more speech frames of a pre-defined time duration.

3. The method of claim 2 further comprising extracting, by the one or more processors, one or more voiced speech frames and one or more unvoiced speech frames from each of the one or more speech frames, wherein the one or more time instances of glottal closures are determined for the one or more voiced speech frames.

4. The method of claim 1 further comprising determining, by the one or more processors, a pitch-synchronous harmonic spectrum of the voice source signal.

5. The method of claim 4 further comprising determining, by the one or more processors, the one or more harmonic contours based on the one or more harmonics of the voice source signal.

6. The method of claim 5, wherein the set of relative harmonic strengths is determined based on a signal analysis or a statistical analysis of the one or more harmonic contours.

7. The method of claim 6 further comprising determining, by the one or more processors, a set of feature vectors based on the set of relative harmonic strengths.

8. The method of claim 1 further comprising determining, by the one or more processors, a set of pitch features, a set of intensity features, and a set of duration features based on a statistical analysis of the speech signal.

9. The method of claim 8 further comprising detecting, by the one or more processors, the sentiment of the human based on one or more of the set of feature vectors, the set of pitch features, the set of intensity features, and the set of duration features using one or more trained classifiers.

10. The method of claim 9, wherein the one or more trained classifiers may comprise one or more of a Support Vector Machine (SVM), a Logistic Regression, a fundamental frequency Bayesian Classifier, a Decision Tree Classifier, a Copula-based Classifier, a K-Nearest Neighbors (KNN) Classifier, a Random Forest (RF) Classifier, or a deep neural net (DNN) classifier.

11. A system for detecting sentiment of a human based on an analysis of human speech, the system comprising;

one or more processors configured to:

determine one or more time instances of glottal closure from a speech signal of the human;

generate a voice source signal based on the determined one or more time instances of glottal closure;

determine a set of relative harmonic strengths based on one or more harmonic contours of the voice source signal, wherein a relative harmonic strength (RHS) is indicative of a deviation of one or more harmonics of the voice source signal from a fundamental frequency of the voice source signal; and determine a set of feature vectors based on the set of relative harmonic strengths, wherein the set of feature vectors is utilizable to detect the sentiment of the human.

12. The system of claim 11, wherein the one or more processors are further configured to sample a speech signal to obtain one or more speech frames of a pre-defined time duration.

13. The system of claim 12, wherein the one or more processors are further configured to extract one or more voiced speech frames and one or more unvoiced speech frames from each of the one or more speech frames, wherein the one or more time instances of glottal closures are determined for the one or more voiced speech frames.

14. The system of claim 11, wherein the one or more processors are further configured to determine a pitch-synchronous harmonic spectrum of the voice source signal.

15. The system of claim 14, wherein the one or more processors are further configured to determine the one or more harmonic contours based on the one or more harmonics of the voice source signal.

16. The system of claim 15, wherein the set of relative harmonic strengths is determined based on a signal analysis or a statistical analysis of the one or more harmonic contours.

17. The system of claim 15, wherein the one or more processors are further configured to determine a set of feature vectors based on the set of relative harmonic strengths.

18. The system of claim 11, wherein the one or more processors are further configured to determine a set of pitch features, a set of intensity features, and a set of duration features based on a statistical analysis of the speech signal.

19. The system of claim 18, wherein the one or more processors are further configured to detect sentiment of the human based on one or more of the set of feature vectors, the set of pitch features, the set of intensity features, and the set of duration features using one or more trained classifiers.

20. A non-transitory computer-readable storage medium having stored thereon, a set of computer-executable instructions for causing a computer comprising one or more processors to perform steps comprising:

determining, by one or more processors, one or more time instances of glottal closure from a speech signal of a human;

generating, by the one or more processors, a voice source signal based on the determined one or more time instances of glottal closure;

determining, by the one or more processor, a relative harmonic strengths based on one or more harmonic contours of the voice source signal, wherein a relative harmonic strength (RHS) is indicative of a deviation of one or more harmonics of the voice source signal from a fundamental frequency of the voice source signal; and determining, by the one or more processors, a set of features vectors based on the set of relative harmonic strengths, wherein the set of features vectors is utilizable to detect sentiment of the human.

* * * * *